G. C. BERRYMAN.
METHOD OF MAKING TUBES FOR AUTOMOBILE TIRES.
APPLICATION FILED AUG. 28, 1916.
1,245,859.
Patented Nov. 6, 1917.
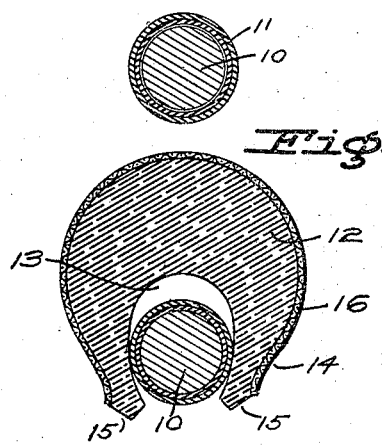
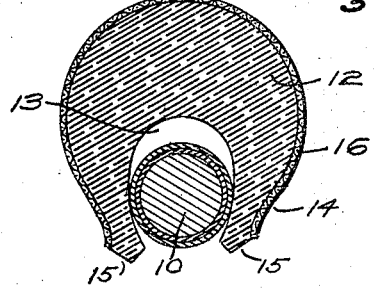
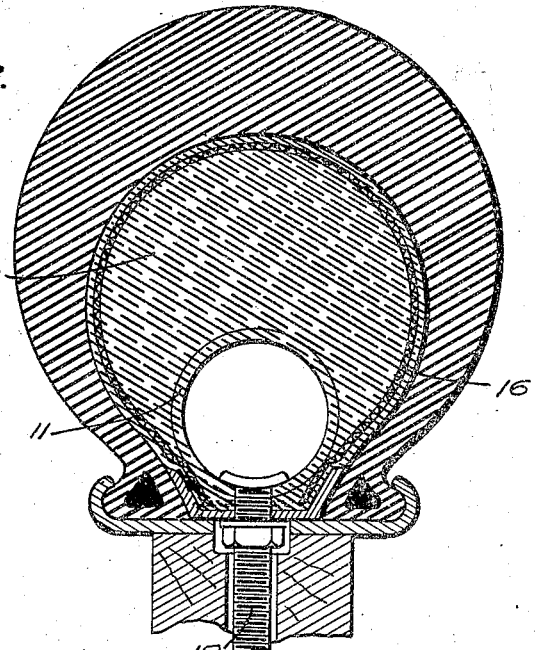
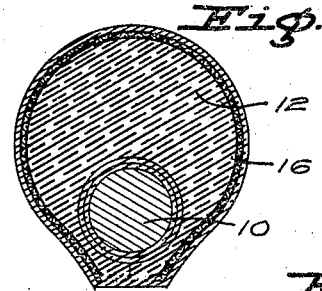
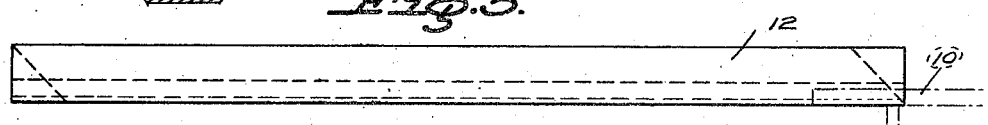
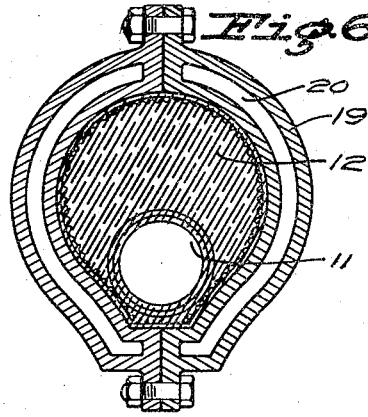
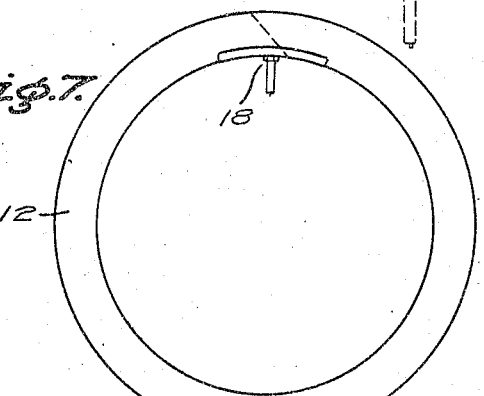
INVENTOR:
GROVER C. BERRYMAN.
BY Hazard Bernd Miller
ATTORNEYS.

UNITED STATES PATENT OFFICE.

GROVER C. BERRYMAN, OF LOS ANGELES, CALIFORNIA.

METHOD OF MAKING TUBES FOR AUTOMOBILE-TIRES.

1,245,859.　　　　　　Specification of Letters Patent.　　Patented Nov. 6, 1917.

Application filed August 28, 1916. Serial No. 117,304.

*To all whom it may concern:*

Be it known that I, GROVER C. BERRYMAN, a citizen of the United States, residing at Los Angeles, in the county of Los Angeles and State of California, have invented new and useful Improvements in Methods of Making Tubes for Automobile-Tires, of which the following is a specification.

My invention relates to a tube for automobile tires and a method of making the same.

It is an object of my invention to provide a tube for an automobile tire which is seamless and which is made integral.

Another object of my invention is to provide a tube having relatively thick walls and a thickened outer peripheral portion thereby providing a wall adjacent the tread portion of the tire which is not easily punctured.

It is another object of my invention to provide a method for producing a finished tube possessing the characteristics above described.

My tire may be used with or without a shoe or outer casing. The ordinary inner-tube is thin-walled having the ends closed and cemented to provide a closed chamber which may be inflated. Such a tube has a tendency to creep within the outer casing tearing the tire valve from the tube and wearing the walls thereof by the uneven strains placed upon them. Furthermore, such tubes are easily punctured causing the outer casing to collapse. With my improved construction, puncturing of the inner-tube is difficult but if such puncture should occur, it would not cause a complete collapse, and consequently injury to the outer casing will be avoided.

With the above and other objects in view which will appear as the description proceeds, my invention consists in the construction and arrangement of parts and in the steps of the method of making the same, hereinafter described and claimed.

In the accompanying drawings which form a part of this specification I have illustrated an embodiment of my invention and the manner in which the tube is manufactured.

Figure 1 is a transverse cross-section of an automobile tire showing my improved tube surrounded by an outer casing and mounted on the rim of an automobile wheel.

Fig. 2 is a vertical cross-section showing the formation of the tubular air chamber formed about a cylindrical mandrel.

Fig. 3 is a cross-section showing the manner of attaching the tubular air chamber to the main body portion of the tube.

Fig. 4 is a cross-section showing the main body portion inclosing the tubular air chamber, the main body portion being provided with a fabric cemented on its periphery, the whole tube being wrapped about with sheets of rubber.

Fig. 5 is a side elevation of the tire mounted on the mandrel.

Fig. 6 is the cross-section of the air tube within a vulcanizing mold.

Fig. 7 is a side elevation of the complete tube.

The process of making my tire is as follows:

On a cylindrical mandrel 10 high grade rubber sheets are spirally wound forming a tubular air chamber 11. I prefer to use sheets of a thickness of $\frac{1}{64}''$ and wind the sheets four times about the mandrel. Upon the tubular air chamber 11 on the mandrel I place an unvulcanized main body portion 12 of the tube the same being substantially cylindrical in shape having a longitudinal groove 13 adapted for the reception of the tubular air chamber 11. The walls 14 of the main body portion 12 adjacent to the groove 13 are tapered as clearly shown in Fig. 3, and terminate in three cornered end 15 adapted to completely inclose the tubular air chamber. Before inserting the tubular air chamber into the longitudinal groove 13 a rubber cement is applied to the outer walls of said chamber and also on the inner walls of the groove 13. The tapered end walls 14 of the main body portion are then pressed toward one another to completely inclose the tubular air chamber 11 as shown in Fig. 4. Next I cement a stout sheet of textile fabric 16 on the outer periphery of the main body portion 12 but leaving the side edges of the tube which engages the rim of the automobile wheel free. About the entire body of the tube as assembled on the mandrel I now wrap in a spiral manner about two layers of high grade rubber sheeting. The next step is to remove the tube from the mandrel, cut the ends thereof beveled for splicing and to insert air valve 18. The latter may be a brass plate about 1" long with a valve stem in the middle. The brass plate will prevent the tube from creeping and pulling the valve stem. The assembled tube is now placed within a vulcanizing mold 19, of any suitable construction and which is provided with a hollow heating chamber 20. The tubular chamber 11 is submitted to a fluid pressure of 60 pounds. Either air, water or ammonia may be used in the inflation of said tube. Steam having a pressure of about 60 lbs. is supplied to the heating chamber 20 and the tube is submitted to this curing process for about 1½ hours, whereby the air chamber 11 and the main body portion 12 are vulcanized into a unitary integral tire tube.

It should be noted that the tube is provided with a textile fabric embedded adjacent to the outer periphery thereof except at its side edges which engages the rim of the automobile allowing for expansion at this place when the air chamber is inflated.

I claim:

1. A method of making a tube for pneumatic tires comprising winding sheets of rubber several times about a cylindrical mandrel to form a tube, inserting said air tube into a longitudinal groove of a cylindrical shaped main body portion of rubber, cementing said tube to the inner wall of said groove, cementing a sheet of textile fabric on said main body portion but leaving said groove open, winding a sheet of rubber completely about the main body portion and causing the walls of said groove to completely inclose said tube, removing said mandrel from said tube, thereby forming an air chamber, splicing the ends of the assembled tire together to form a ringshaped endless tire, inserting a valve stem in said air chamber, placing said air chamber under fluid pressure and curing the assembled tire in the usual manner.

2. A method of making a tube for pneumatic tires comprising winding a sheet of rubber about a cylindrical mandrel to form a tube, inserting said tube into a longitudinal groove formed in a main body portion of rubber, cementing said tube to the inner walls of said groove, winding a sheet of rubber completely about the main body portion and causing the walls of said groove to completely inclose said tube, removing said mandrel from said tube, thereby forming an air chamber, splicing the ends of the assembled tire together to form a ring shaped endless tire, inserting a valve stem in said air chamber, placing said air chamber under fluid pressure, and curing the assembled tire in the usual manner.

In testimony whereof I have signed my name to this specification.

GROVER C. BERRYMAN.

Copies of this patent may be obtained for five cents each, by addressing the "Commissioner of Patents, Washington, D. C."